US010319198B2

(12) United States Patent
Chaubard et al.

(10) Patent No.: US 10,319,198 B2
(45) Date of Patent: Jun. 11, 2019

(54) EXPEDITED CHECKOUT SYSTEM THROUGH PORTABLE CHECKOUT UNITS

(71) Applicant: Focal Systems, Inc., Millbrae, CA (US)

(72) Inventors: Francois Chaubard, Millbrae, CA (US); Adriano Quiroga Garafulic, Sao Paulo (BR)

(73) Assignee: Focal Systems, Inc., Millbrae, CA (US)

( * ) Notice: Subject to any disclaimer, the term of this patent is extended or adjusted under 35 U.S.C. 154(b) by 0 days.

(21) Appl. No.: 15/583,713

(22) Filed: May 1, 2017

(65) Prior Publication Data

US 2017/0316656 A1 Nov. 2, 2017

Related U.S. Application Data

(60) Provisional application No. 62/330,802, filed on May 2, 2016.

(51) Int. Cl.
*G07G 1/00* (2006.01)
*G06Q 30/06* (2012.01)
(Continued)

(52) U.S. Cl.
CPC ......... *G07G 1/0045* (2013.01); *G06Q 20/208* (2013.01); *G06Q 20/3223* (2013.01); *G06Q 30/0633* (2013.01); *G06Q 20/202* (2013.01)

(58) Field of Classification Search
USPC ........................................ 235/383
See application file for complete search history.

(56) References Cited

U.S. PATENT DOCUMENTS 5,821,512 A 10/1998 O'Hagan et al.
6,434,530 B1 8/2002 Sloane et al.
(Continued)

FOREIGN PATENT DOCUMENTS

CN 202806824 U 3/2013
CN 202896621 U 4/2013
(Continued)

OTHER PUBLICATIONS

PCT International Search Report and Written Opinion, PCT Application No. PCT/US2017/030429, dated Jul. 19, 2017, 15 pages.
(Continued)

*Primary Examiner* — Rafferty D Kelly
(74) *Attorney, Agent, or Firm* — Fenwick & West LLP

(57) ABSTRACT

An expedited checkout system allows a customer to generate a virtual shopping list on a client application operating on the customer's mobile device, and expedite checkout from a store using the client application. While shopping within a store, a customer can temporarily secure a mobile device to a portable checkout unit that is attached to a shopping cart. The portable checkout unit can receive item identifiers from an item scanner and transmits item identifiers to the customer's mobile device. The customer's mobile device generates a virtual shopping list of the items collected by the customer and, when the customer is ready to check out of the store, the customer can select a checkout option presented on the mobile device. In response to receiving the checkout selection, the mobile device initiates a checkout transaction to check out the customer from the store.

20 Claims, 9 Drawing Sheets

(51) Int. Cl.
 *G06Q 20/32* (2012.01)
 *G06Q 20/20* (2012.01)

(56) References Cited

U.S. PATENT DOCUMENTS

| | | | |
|---|---|---|---|
| 9,443,314 | B1 | 9/2016 | Huang et al. |
| 2006/0208072 | A1 | 9/2006 | Ku et al. |
| 2006/0219780 | A1 | 10/2006 | Swartz et al. |
| 2007/0284440 | A1 | 12/2007 | Birmingham et al. |
| 2008/0230603 | A1* | 9/2008 | Stawar .................. B62B 3/1408 235/383 |
| 2010/0096450 | A1 | 4/2010 | Silverbrook et al. |
| 2012/0284132 | A1 | 11/2012 | Kim et al. |
| 2014/0079321 | A1 | 3/2014 | Huynh-Thu et al. |
| 2014/0164176 | A1 | 6/2014 | Kitlyar |
| 2014/0176727 | A1 | 6/2014 | Saptharishi et al. |
| 2014/0207590 | A1* | 7/2014 | Bouaziz .............. G06Q 20/20 705/18 |
| 2015/0025969 | A1* | 1/2015 | Schroll .............. G06Q 30/0633 705/14.53 |
| 2015/0039458 | A1 | 2/2015 | Reid |

FOREIGN PATENT DOCUMENTS

| | | |
|---|---|---|
| CN | 203142736 U | 8/2013 |
| EP | 2381409 A2 | 10/2011 |
| WO | WO 2005/096237 A1 | 10/2005 |
| WO | WO 2016/135142 A1 | 9/2016 |
| WO | WO 2018/002864 A2 | 1/2018 |

OTHER PUBLICATIONS

PCT International Search Report and Written Opinion, PCT Application No. PCT/US18/16317, dated Apr. 19, 2018, 17 pages.
PCT International Search Report and Written Opinion, PCT Application No. PCT/US18/32610, dated Aug. 24, 2018, 17 pages.

* cited by examiner

EXPEDITED CHECKOUT SYSTEM THROUGH PORTABLE CHECKOUT UNITS

CROSS REFERENCE TO RELATED APPLICATION

The present disclosure claims benefit to U.S. Provisional Patent Application No. 62/330,802, entitled "Customer Operated Store Checkout System" and filed on May 2, 2016, which is hereby incorporated by reference.

BACKGROUND

In conventional stores, a customer collects items in a shopping cart or a hand-held basket, and brings the collected items to a cashier. Typically, the cashier must scan a barcode that is printed or placed on each item the customer is purchasing, and a point-of-sale (POS) system determines the total price of the collected items. However, this method for checking out a shopper in a store is inefficient. A cashier must scan each item purchased by every customer who shops at the store. If too many customers want to check out of the store at the same time, a customer may have to wait in line for a long time before a cashier can check out the customer from the store. Some stores parallelize this process by making more than one cashier and POS system available to customers. However, stores must pay cashiers to be available to check out customers, and thus additional cashiers may be prohibitively expensive for stores.

Some stores include automated point-of-sale systems wherein a customer uses the point-of-sale system directly to purchase their items and check out of the store without a cashier. However, these automated POS systems can still be prone to long lines, and the unfamiliar user interfaces can be difficult for a customer to use.

SUMMARY

An expedited checkout system allows a customer to generate a virtual shopping list on a client application operating on the customer's mobile device, and expedite checkout from a store using the client application. While shopping within a store, a customer can temporarily secure a mobile device to a portable checkout unit that is attached to a shopping cart or a hand-held basket. The portable checkout unit communicates with the mobile device via a wired or wireless interface, and includes an item scanner that the customer can use to scan items within the store as the customer collects the items. The portable checkout unit can receive item identifiers using the item scanner, wherein each item identifier identifies an item type, such as a particular product, brand, or category.

The portable checkout unit transmits item identifiers to the customer's mobile device and the customer's mobile device generates a virtual shopping list of the items collected by the customer. The virtual shopping list includes one or more list elements, where each list element stores an item identifier and a count of the items collected by the customer that are associated with the item identifier. If a customer scans an item with an item identifier that is already stored in a list element of the virtual shopping list, the mobile device increments the count of the list element. If the item identifier is not already stored in a list element, the mobile device generates a new list element that includes the item identifier.

When the customer is ready to check out of the store, the customer can select a checkout option presented on the mobile device. In response to receiving the checkout selection, the mobile device initiates a checkout transaction to check out the customer from the store. In some embodiments, the mobile device presents a user interface to the customer that allows the customer to checkout via the mobile device directly or via a payment interface embedded in the portable checkout unit. Alternatively, the mobile device may prompt the customer to check out via a POS system operated by an attendant. The mobile device may present an identifier for the virtual shopping list to the POS system and the POS system may download the virtual shopping list from a computing system operated by the store or from the customer's mobile device. The customer then provides payment information to the POS system to check out of the store.

The expedited checkout system improves the checkout procedures in conventional stores by allowing a customer to scan items while shopping within the store. Thus, if the customer checks out of the store using a POS system operated by an attendant, the attendant can simply verify that the customer's virtual shopping list includes all of the items collected by the customer, and then proceed directly to collecting payment information from the customer. Thus, each customer spends less time at the POS system, which reduces the amount of time that a customer spends in line at the store. Additionally, the store can reduce the number of POS systems and attendants that are needed to efficiently check customers out of the store, thereby reducing costs for the store. Furthermore, if the customer is able to check out of the store via the mobile device directly without going to a POS system, the wait time for customers and the costs for the store can be reduced even further.

DETAILED DESCRIPTION

Example System Diagram

Figure 1:
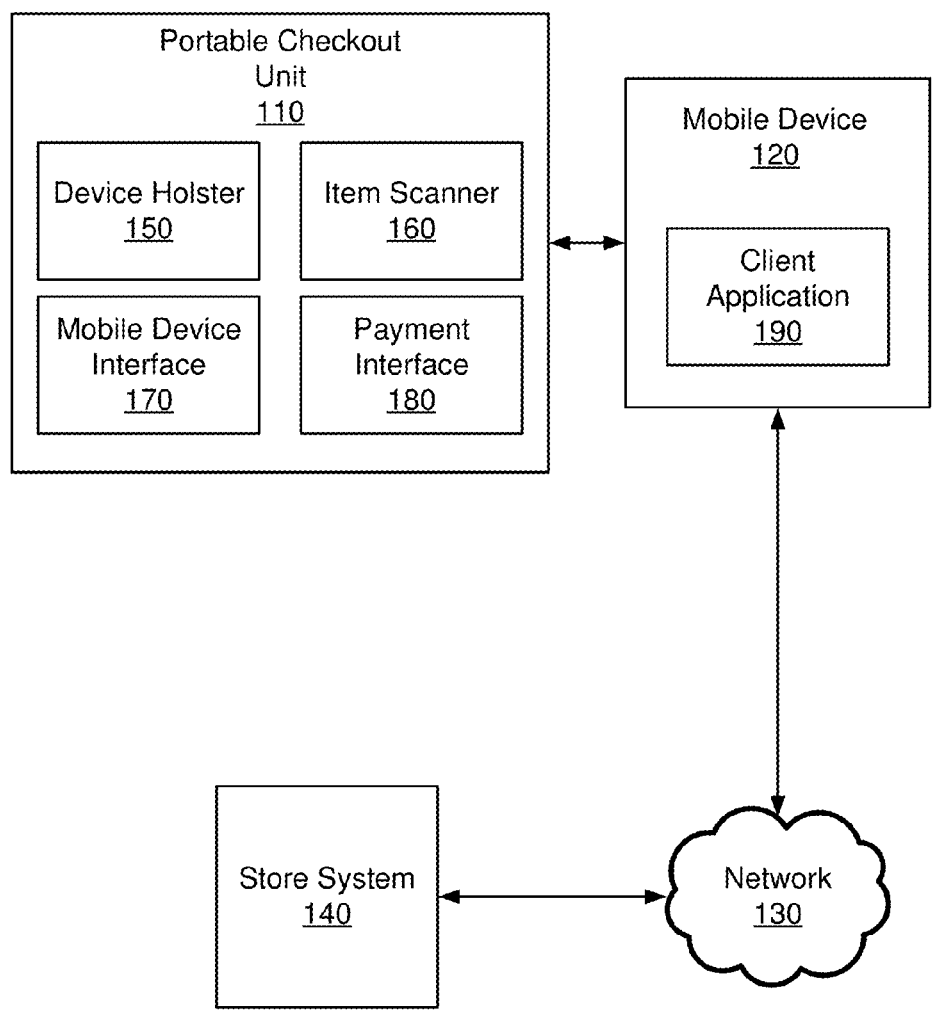
FIG. 1 is a system diagram for an example expedited checkout system, in accordance with some embodiments.

An expedited checkout system allows a customer to generate a virtual shopping list on a client application operating on the customer's mobile device, and expedite checkout from a store using the client application. FIG. 1 is a system diagram for an example expedited checkout system 100, in accordance with some embodiments. The expedited checkout system 100 illustrated in FIG. 1 includes a portable checkout unit 110, a mobile device 120, a network 130, and a store system 140. Alternate embodiments may include more, fewer, or different components from those illustrated in FIG. 1. For example, while a single portable checkout unit 110 and mobile device 120 are illustrated in FIG. 1, alternate embodiments may include multiple portable checkout units 110 and multiple mobile devices 120. The functionality of each component may be divided between the components differently from the description below. Furthermore, each component may perform their respective functionalities in response to a request from a human, or automatically without human intervention.

The portable checkout unit 110 allows a customer to generate a virtual shopping list on the mobile device 120 while the customer collects items within a store. The portable checkout unit 110 is physically attached to a shopping cart or a hand-held basket that is made available by a store that is using the expedited checkout system 100. In some embodiments, the portable checkout unit 110 can be attached to a pre-exiting shopping cart or hand-held basket, e.g. via a bracket, a mount, a strap, screws, bolts, or adhesive. In other embodiments, the portable checkout unit 110 can be manufactured into the cart itself. The portable checkout unit 110 includes a device holster 150 that can temporarily secure the customer's mobile device 120 to the portable checkout unit 110 while the customer travels through the store. The device holster 150 can include a molded plastic piece that can hold the customer's mobile device 120, and a spring-loaded mechanism that holds the molded plastic piece against the mobile device 120.

The portable checkout unit 110 includes an item scanner 160 which a customer can use to scan items in the store. The item scanner 160 can include a one-dimensional laser barcode scanner, a two-dimensional laser barcode scanner, a camera-based image processing scanner, or a radio-frequency identification (RFID) scanner. The item scanner 160 can scan an item and transmit an item identifier associated with the item to the mobile device 120. The item identifier identifies a type of the item that is scanned by the item scanner. An item type describes a particular product, brand, or category. In some embodiments, the item identifier is a stock keeping unit or a universal product code. The portable checkout unit 110 communicates with the mobile device 120 via the mobile device interface 170. For example, the portable checkout unit 110 may use the mobile device interface 170 to transmit an item identifier to the mobile device 120. The mobile device interface 170 can include a physical port on the portable checkout unit, a cable that can connect to a port on the mobile device 120, or a wireless interface (e.g., Bluetooth®, Near-Field Communication, or Wi-Fi interface).

In some embodiments, the portable checkout unit 110 includes a payment interface 180 that allows the customer to check out from the store without going to a POS system. For example, the payment interface 180 may include a magnetic card reader, an EMV reader, or an NFC scanner to receive payment information from the customer. Payment information can include credit card information, debit card information, bank account information, or peer-to-peer payment service information. The payment interface 180 transmits payment information to the mobile device 120 for execution of the checkout transaction. In some embodiments, the payment interface includes a thermal printer that prints a receipt for the checkout transaction.

The mobile device 120 is a mobile computing device, such as a smartphone, tablet, or laptop computer, capable of executing a client application 190 that communicates with the portable checkout unit 110 and the store system 140. The client application 190 stores a virtual shopping list for the customer's visit to the store. The virtual shopping list is a list of one or more list elements that describe items that the customer has collected in a shopping cart or a hand-held basket to purchase from the store. Each list element includes an item identifier and a count of items collected by the customer that are associated with the item identifier. If the client application 190 receives an item identifier from the portable checkout unit 110, the client application 190 updates the virtual shopping list to include the item associated with the item identifier. If a list element associated with the received item identifier does not exist yet, the client application 190 generates a new list element and stores the new list element in the virtual shopping list. If the list element already exists, the client application 190 increments the count associated with the list element.

The mobile device 120 presents the virtual shopping list to the customer via a display. The virtual shopping list is presented with the list elements stored in the virtual shopping list, and may present the item identifier and item count associated with each list element. Each list element may also be presented with information about the items associated with the list elements, such as the names of the items, descriptions of the items, a picture of the item, pricing information of each item, or nutrition information of each item. The client application 190 may receive the item information from an item database stored by the store system 140 via the network 130. To receive the item information from the store system 140, the client application 190 may transmit the item identifier to the store system 140 and, in response to receiving the item identifier, the store system 140 may transmit item information associated with the item identifier to the client application 190. In some embodiments, some or all of the item database is stored by the portable checkout unit 110 or the mobile device 120. The client application 190 may also present advertisements or coupons to the customer that are related to the items in the customer's virtual shopping list. For example, if the customer has bread in their virtual shopping list, the mobile device 190 may present advertisements or coupons for sliced meats or for condiments.

In some embodiments, when the customer is ready to checkout from the store, the customer can select a checkout option presented by the client application 190 and, in response, the client application 190 initiates the transaction for the customer to check out of the store. In some embodiments, the customer checks out of the store without going to a POS system. For example, the customer may use the payment interface 180 provided by the portable checkout unit 110 to pay for the items in their virtual shopping list, or may be able to enter payment information through the client application 190. In some embodiments, the client application 190 stores the customer's payment information to be used in future transactions. The client application 190 transmits payment information received from the customer to the store system 140 to execute the checkout transaction. If the payment information is valid and the transaction is successful, the client application 190 receives is notified by the store system 140 that the transaction was successful, and presents a notification to the customer with a receipt for the checkout transaction. The client application 190 may transmit the receipt for the transaction to the portable checkout unit 110 to be printed for the customer through a thermal printer, or may provide an option to the customer to be sent an electronic receipt for the transaction (e.g., via email or text message). In some embodiments, an employee of the store confirms that the customer has only the items that the customer has purchased. The customer may be required to present a receipt to the employee for the checkout transaction, such as printed receipt, an electronic receipt transmitted to the customer, or a receipt stored by the client application 190.

In some embodiments, the customer checks out via a POS system. The customer may be required to provide a customer identifier or a shopping list identifier to a cashier operating the POS system. For example, the customer may be required to provide their name, their initials, a customer identification number, an email address, a username, or a shopping list identification number. In some embodiments, the client application 190 presents a shopping list identifier to be used to identify the customer's virtual shopping list to the POS system. For example, the client application 190 may present a PIN, a one-dimensional barcode, or a two-dimensional barcode that can be used to identify the customer's virtual shopping list. When the POS system receives the shopping list identifier, the POS system retrieves the virtual shopping list from the store system 140 or the mobile device 120. The employee operating the POS system may check the items collected by the customer and ensure that the items are accounted for in the virtual shopping list. The customer uses the POS system to provide payment information for the transaction and can receive a receipt for the transaction from the POS system physically or electronically.

The mobile device 120 can communicate with the store system 140 via the network 130, which may comprise any combination of local area and wide area networks employing wired or wireless communication links. In some embodiments, the network 130 uses standard communications technologies and protocols. For example, the network 130 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 130 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 130 may be represented using any format, such as hypertext markup language (HTML) or extensible markup language (XML). All or some of the communication links of the network 130 may be encrypted. In some embodiments, the network 130 comprises a network operated by the store that uses the expedited checkout system 100.

The store system 140 comprises one or more computing devices that are operated by a store that uses the expedited checkout system 100. The store system 140 stores a database of item information for items sold by the store. For example, the store system 140 may store item identifiers, item names, item descriptions, item reviews, item pictures, advertisements associated with items, and coupons associated with items. In some embodiments, the store system 140 also stores a copy of virtual shopping lists for customers shopping within the store. The store system 140 may receive the virtual shopping lists from the customers' mobile devices 120 when the virtual shopping lists are updated or when the customer is about to check out of the store. In some embodiments, the store system 140 receives payment information from the mobile device 120 or a POS system at which the customer is checking out to charge the customer for the items in their virtual shopping list.

Example Portable Checkout Units

Figure 2:
FIG. 2 illustrates an example portable checkout unit attached to a shopping cart or a hand-held basket, in accordance with some embodiments.
Figure 3:
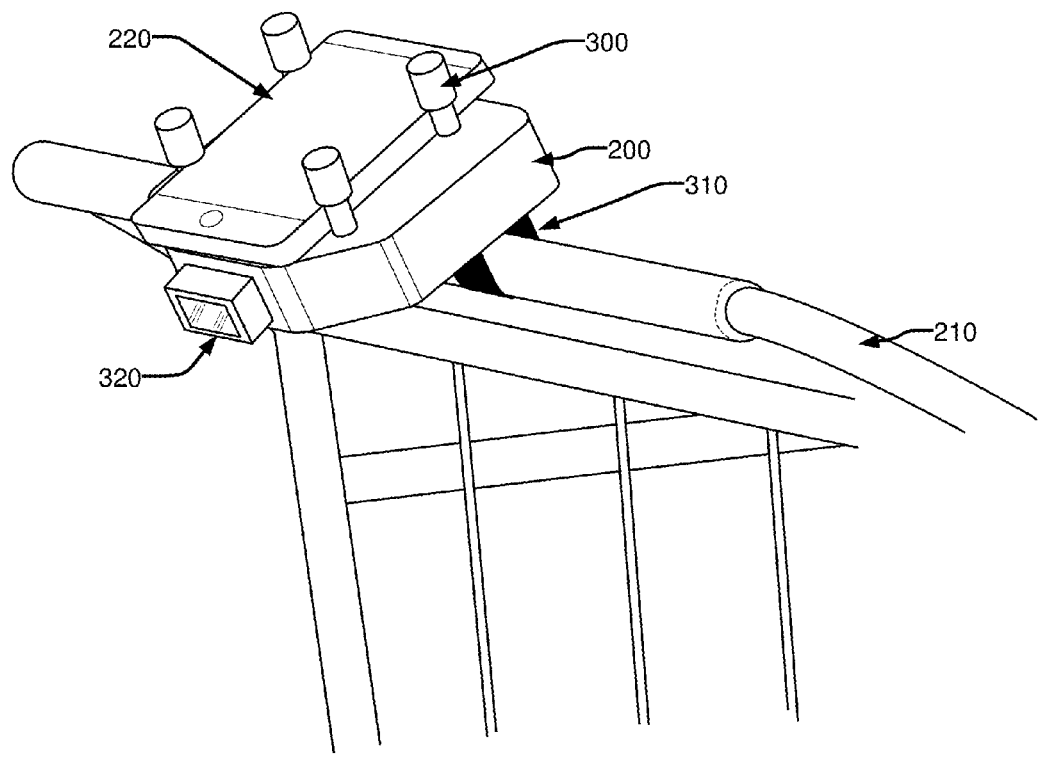
FIG. 3 illustrates a mobile device temporarily secured to a portable checkout unit, in accordance with some embodiments.
Figure 4:
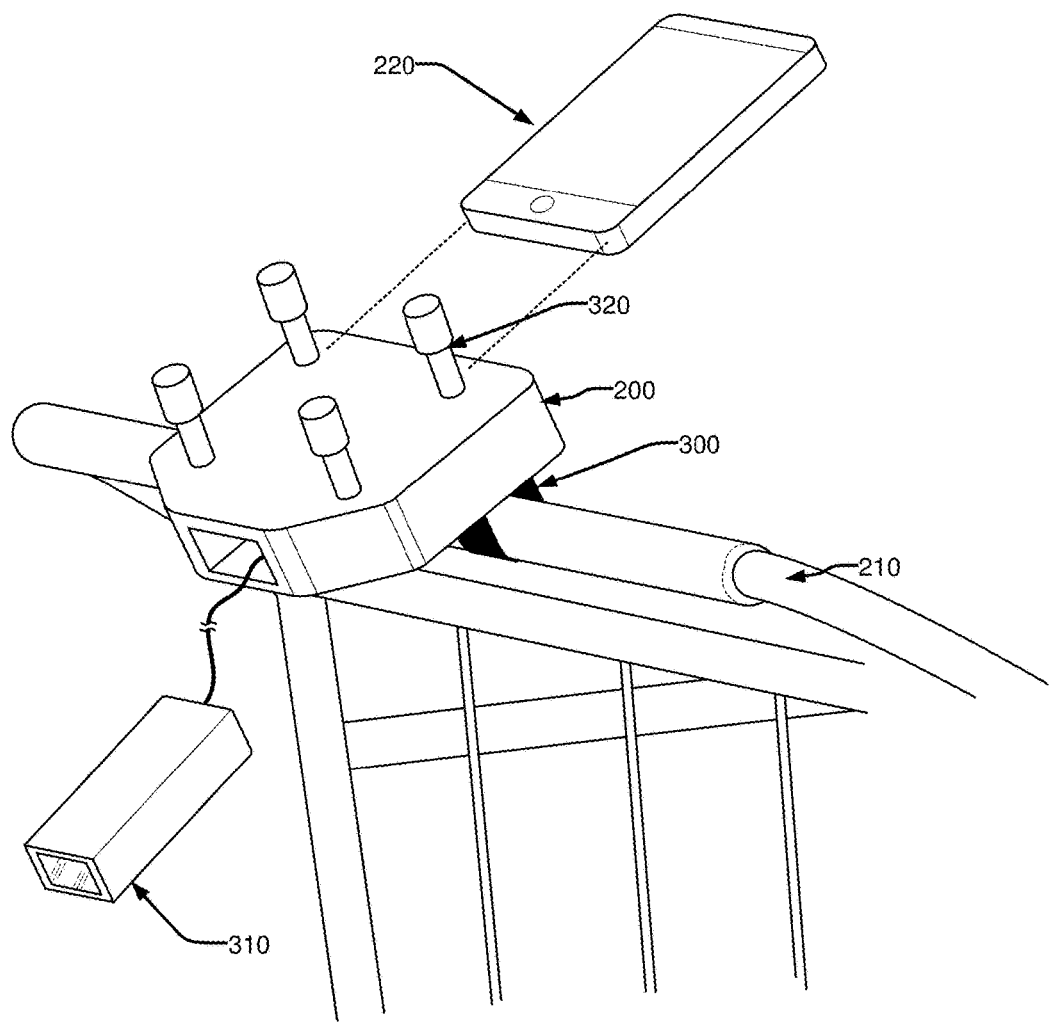
FIG. 4 illustrates an item scanner detached from a portable checkout unit, in accordance with some embodiments.

FIG. 2 illustrates an example portable checkout unit 200 that is attached to a shopping cart 210, in accordance with some embodiments. As described above, the portable checkout unit 200 could alternatively be attached to a basket held by the user. A mobile device 220 is temporarily secured to the portable checkout unit, which is illustrated in FIG. 3 in more detail. The mobile device 220 is temporarily secured to the portable checkout unit 200 via a holster 300. In the embodiment illustrated in FIG. 3, the mobile device 220 communicates with the portable checkout unit 200 via a wireless connection, however the mobile device 220 may alternatively communicate with the portable checkout unit 200 via a physical, wired connection. The portable checkout unit 200 is attached to the shopping cart 210 via a bracket 310. Thus, the portable checkout unit 200 can be attached to a pre-existing shopping cart 210. The portable checkout unit 200 includes an item scanner 320, such as a barcode scanner. As shown in FIG. 4, the item scanner 310 can be detached from the portable checkout unit 200, thereby allowing a customer to more easily scan an item while the item is on a shelf or on the floor. FIG. 4 also illustrates a mobile device 220 that is no longer secured to the portable checkout unit 200.

Figure 5:
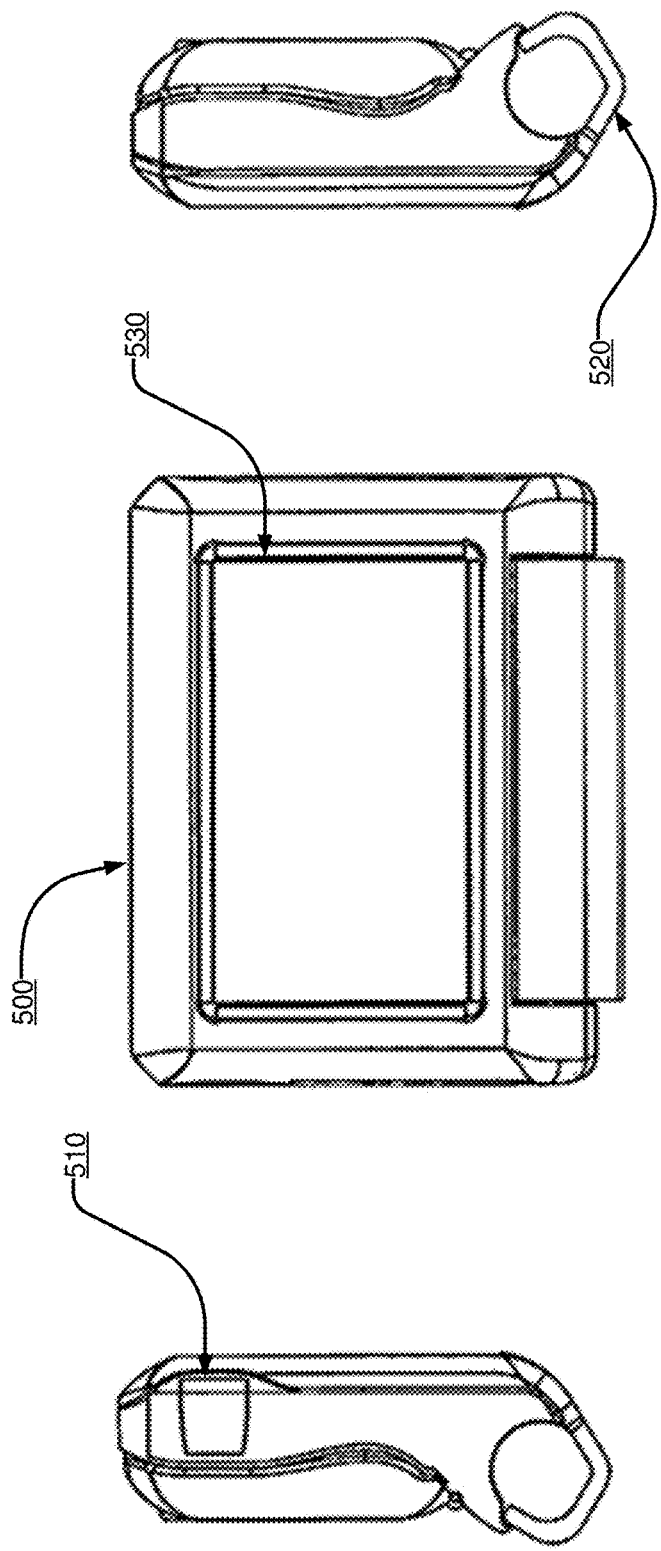
FIG. 5 illustrates an alternate embodiment of the portable checkout unit, in accordance with some embodiments.

FIG. 5 illustrates an alternate embodiment of the portable checkout unit 500, in accordance with some embodiments. The portable checkout unit 500 illustrated in FIG. 5 includes a camera based item scanner 510 that a customer can use to scan items as the customer is shopping. Additionally, the portable checkout unit 500 connects with a customer's mobile device via a wireless interface (e.g., via a Bluetooth® connection), and wirelessly transmits item identifiers received by the item scanner 510 to the customer's mobile device. The wireless connection between the portable checkout unit 500 and the customer's mobile device allows the customer to keep their mobile device on their person (e.g., in their hand, pocket, bag, or purse).

The portable checkout unit 500 includes a bracket 520 that can be used to attach the portable checkout unit 500 to a shopping cart or hand-held basket. Additionally, the portable checkout unit includes a display 530 on which the portable checkout unit 500 can display information to the customer. For example, the customer may use the display to establish the wireless connection between their mobile device and the portable checkout unit 500. Additionally, the portable checkout unit 500 may display advertisements, item information, or am map of the store to the customer via the display 530.

Example User Interfaces

Figure 6:
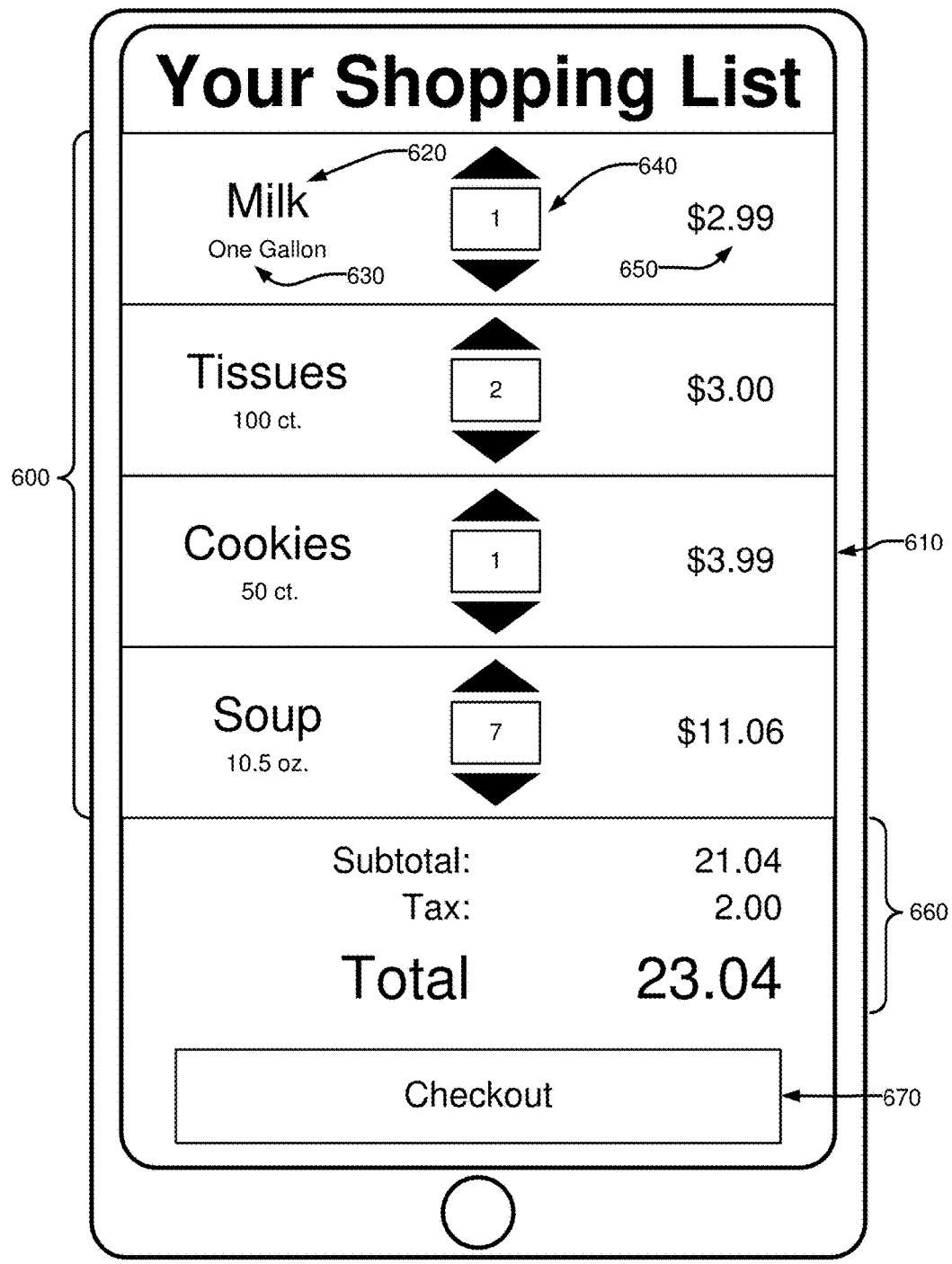
FIG. 6 illustrates an example user interface with a virtual shopping list displayed by a mobile device via a client application, in accordance with some embodiments.

FIG. 6 illustrates an example user interface with a virtual shopping list 600 displayed by a mobile device 120 via a client application 190, in accordance with some embodiments. The virtual shopping list 600 includes list elements 610 for items that the customer has collected in a shopping cart or a hand-held basket while at the store. For example, the virtual shopping list 600 indicates that the customer has collected a gallon of milk, two boxes of tissues, one package of cookies, and seven cans of soup. For each list element 610 in the virtual shopping list 600, client application 190 presents information about each item, such as the name of the item 620, an item description 630, the number of items 640 collected by the customer of each item type, and a total price 650 of the items of each item type.

To add an item to the virtual shopping list 600, the customer may scan a barcode on the item using the item scanner 170 of the portable checkout unit 110. The portable checkout unit 110 transmits the item identifier scanned from the barcode of the item to the mobile device 120, and the client application 190 displays a list element associated with the item identifier along with a count that indicates that the item has been added to the customer's shopping cart or a hand-held basket. If the customer scans an item of an item type that has already been added to the cart, then the count for the list element associated with the item identifier is incremented to indicate that the new item has been added. For example, if the customer scans another package of cookies, the virtual shopping list 600 updates the count of cookie packages in the customer's shopping cart or a hand-held basket from one to two. In the embodiment illustrated in FIG. 6, the virtual shopping list 600 includes options for a customer to manually update the count of each item type.

The client application 190 displays information 660 about the cost of purchasing the items in the customer's virtual shopping list 600, such as the total cost of the items, the amount of tax the customer would will have to pay, and the total cost to the customer for purchasing the items. When the customer is ready to check out, the customer can select the checkout option 670.

Figure 7:
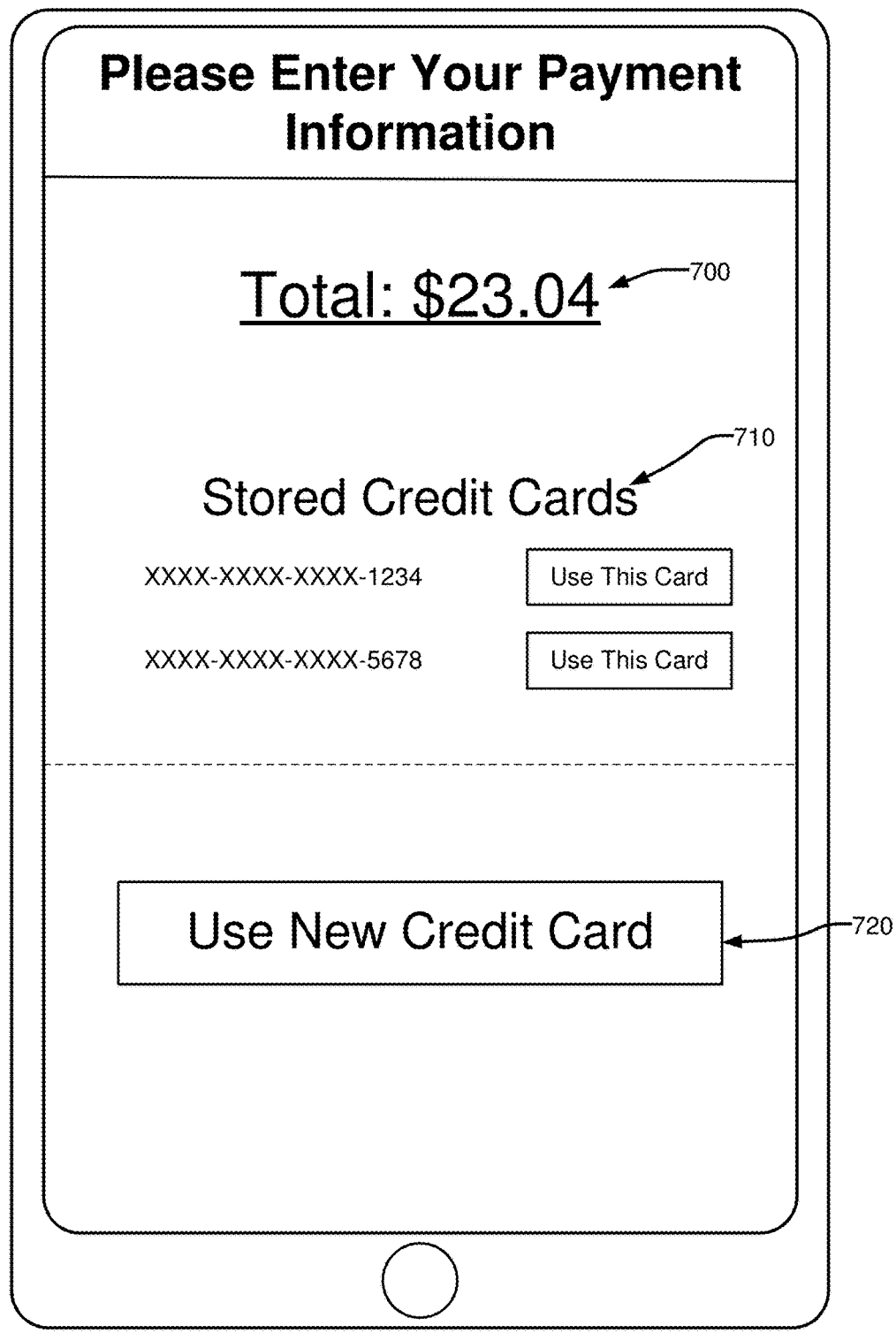
FIG. 7 illustrates an example user interface that allows a customer to checkout from a store via a client application, in accordance with some embodiments.

FIG. 7 illustrates an example user interface that allows a customer to checkout from a store via the client application 190, in accordance with some embodiments. The client application 190 displays the total cost 700 to purchase the items in the customer's virtual shopping list. The client application 190 displays methods of payment 710 from previous purchases the customer has made using the client application. The client application 190 also allows the customer to input new payment methods to be used to purchase the items in the customer's virtual shopping list. To input a new payment method, the customer may be prompted to provide payment information through the client application 190 or may use a payment interface 180 on the portable checkout unit 110.

Figure 8:
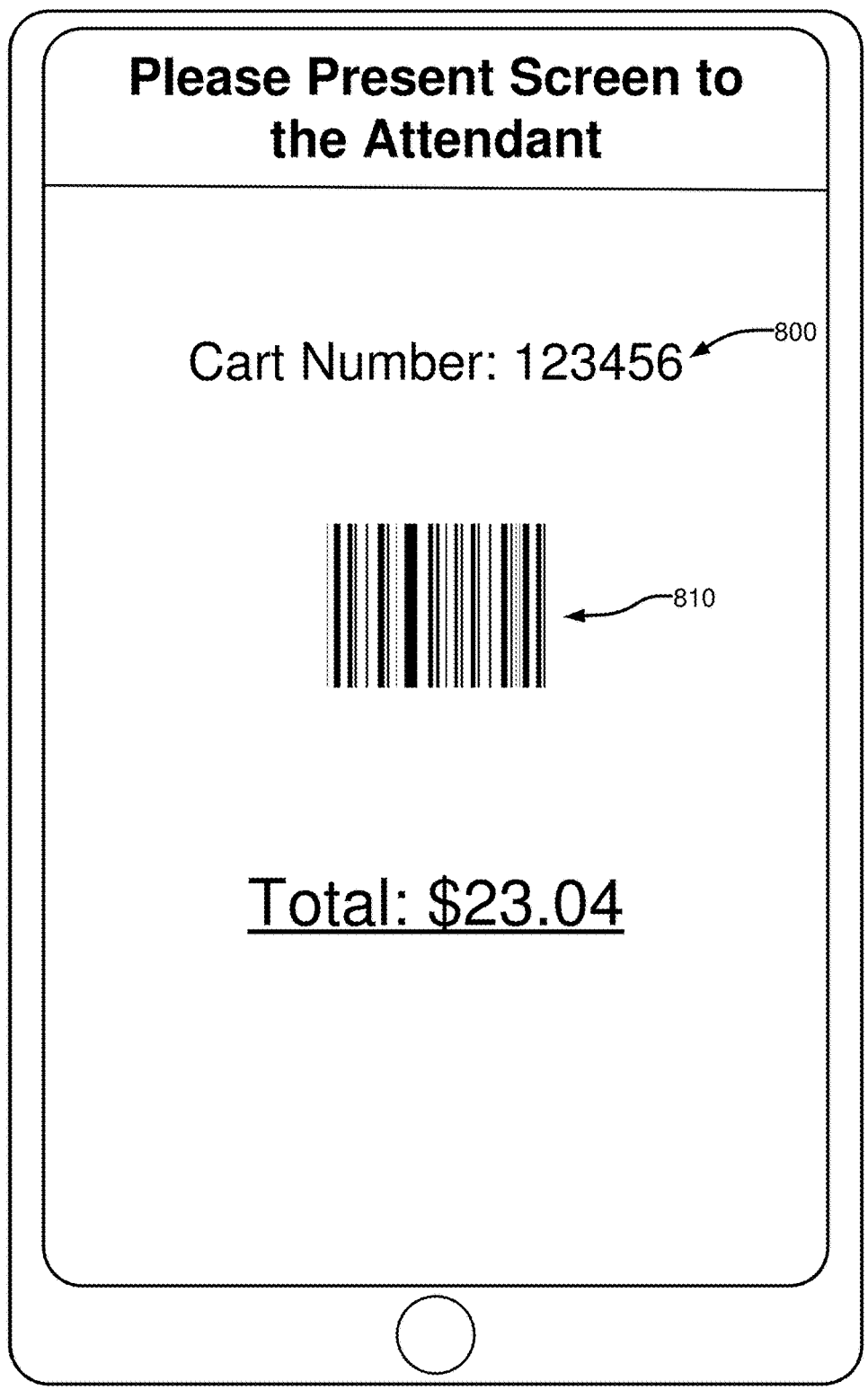
FIG. 8 illustrates an example user interface wherein a client application presents information for identifying a virtual shopping list to an attendant, in accordance with some embodiments.

In some embodiments, the example user interface illustrated in FIG. 7 is presented to the customer in situations where the customer is not required to checkout via a POS system within a store. However, some embodiments may require that a customer check out through a POS system operated by an attendant of the store, thereby allowing an attendant to review the items collected by the customer and ensure that the virtual shopping list includes all items collected by the customer. FIG. 8 illustrates an example user interface wherein the client application 190 presents information for identifying a virtual shopping list to an attendant, in accordance with some embodiments. The client application displays an identifier 800 for the customer's virtual shopping list, as well as a barcode 810 that can be scanned by the attendant. The POS system operated by the attendant can retrieve the virtual shopping list from the store system 140 or from the client application 190, and the customer uses the POS system to pay for the items in their virtual shopping list.

Expedited Store Checkout

Figure 9:
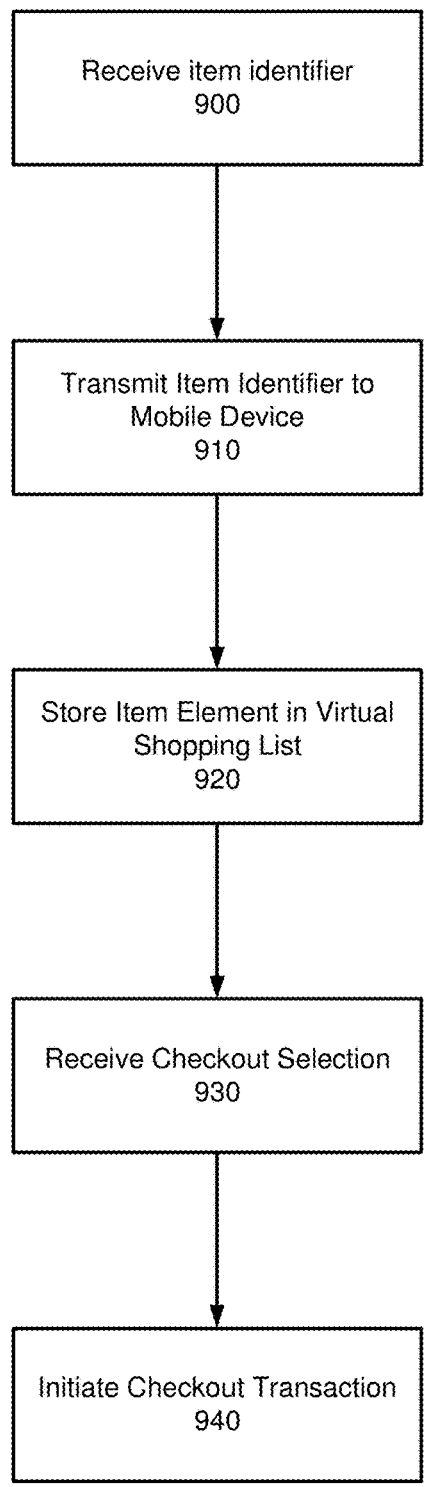
FIG. 9 is a flowchart for a method of expedited checkout of a customer at a store, in accordance with some embodiments.

FIG. 9 is a flowchart for a method of expedited checkout of a customer at a store, in accordance with some embodiments. Alternate embodiments may include more, fewer, or different steps from those illustrated in FIG. 9, and the steps may be performed in a different order from that illustrated in FIG. 9. Additionally, each of these steps may be performed automatically by the expedited checkout system without human intervention.

A portable checkout unit receives 900 an item identifier for an item collected by a customer as the customer is shopping in a store. The portable checkout unit may receive the item identifier via an item scanner that is integrated into the portable checkout unit. The portable checkout unit transmits 910 the item identifier to the customer's mobile device, and the mobile device stores 920 the item identifier in a list element of a virtual shopping list. The list element includes the item identifier and a count of items collected by the customer that are associated with the item identifier.

The mobile device receives 930 a selection from the customer to checkout from the store and, in response to receiving the checkout selection, the mobile device initiates 940 the checkout transaction. In some embodiments, the mobile device presents an interface that allows the customer to checkout directly using the mobile device. For example, the customer may be prompted to enter payment information using the mobile device's user interface, and the mobile device transmits the payment information to a system operated by the store to execute the checkout transaction. Alternatively, the customer may be prompted to use a payment interface integrated into the portable checkout unit to checkout from the store. For example, the customer may use a magnetic card reader embedded in the portable checkout unit to provide payment information for the checkout transaction. The portable checkout unit transmits the received payment information to the mobile device, and the mobile device may transmit the payment information to the store's system to execute the checkout transaction.

In some embodiments, the mobile device prompts the customer to check out using a POS system within the store. The mobile device can present a shopping list identifier associated with the customer's virtual shopping list to an attendant of the POS system. The POS system downloads the customer's virtual shopping list and the customer provides payment information to the POS system to check out of the store. In some embodiments, the mobile device uploads the customer's virtual shopping list to the store's system when the mobile device receives the checkout selection from the customer, and the POS system downloads the customer's virtual shopping list from the store's system. Alternatively, the mobile device transmits the virtual shopping list to the POS system directly.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving, at a portable checkout unit, an item identifier identifying an item sold by a store;
   transmitting, from the portable checkout unit, the item identifier to a mobile device belonging to a customer of the store, the mobile device including a client application associated with the store that facilitates communication between the portable checkout unit and the mobile device, the client application on the mobile device being configured to:
     store, at the mobile device, an item element for the item received from the portable checkout unit within a virtual shopping list of items to be purchased by the customer, the item element comprising the item identifier and a count of items associated with an item type of the item;
     receive, at the mobile device, a selection from the customer to checkout from the store; and
     responsive to receiving the selection from the customer, initiate a checkout transaction between the customer and the store via the client application to purchase the items in the virtual shopping list from the mobile device.

2. The method of claim 1, wherein initiating the checkout transaction between the customer and the store comprises:
   receiving the list identifier at a point-of-sale system within the store; and
   transmitting the virtual shopping list from the store system to the point-of-sale system.

3. The method of claim 2, wherein initiating the checkout transaction further comprises: receiving payment information from the customer at the point-of-sale system for items collected by the customer, the items corresponding to list elements stored within the virtual shopping list.

4. The method of claim 2, further comprising: presenting a list identifier for the virtual shopping list via the mobile device.

5. The method of claim 4, wherein the item scanner is one of a one-dimensional barcode scanner, a two-dimensional barcode scanner, a camera-based image processing scanner, and a radio-frequency identification scanner.

6. The method of claim 1, wherein initiating the checkout transaction comprises:
   receiving payment information from the customer via the mobile device; and
   executing the checkout transaction using the received payment information.

7. The method of claim 1, wherein the portable checkout unit comprises an item scanner, and wherein the item identifier is received via the item scanner.

8. The method of claim 1, wherein the item identifier is transmitted to the mobile device via a wired connection between the portable checkout unit and the mobile device.

9. The method of claim 1, wherein the item identifier is transmitted to the mobile device via a wireless connection between the portable checkout unit and the mobile device.

10. The method of claim 1, wherein the portable checkout unit includes a holster for the mobile device, and wherein the mobile device is temporarily secured to the portable checkout unit via the holster.

11. The method of claim 10, further comprising: responsive to the list element already existing within the virtual shopping list, incrementing the count associated with the list element.

12. The method of claim 10, further comprising: responsive to the list element not already existing within the virtual shopping list, adding the list element to the virtual shopping list.

13. The method of claim 1, wherein the virtual shopping list comprises a plurality of list elements, each list element associated with an item collected by the customer.

14. The method of claim 1, wherein storing the list element in the virtual shopping list comprises: determining whether a list element associated with the received item identifier already exists within the virtual shopping list.

15. A non-transitory, computer-readable medium comprising instructions that, when executed by a processor, cause the processor to:
   receive, at a portable checkout unit, an item identifier identifying an item sold by a store;
   transmit, from the portable checkout unit, the item identifier to a mobile device belonging to a customer of the store, the mobile device including a client application associated with the store that facilitates communication between the portable checkout unit and the mobile device, the client application on the mobile device being configured to:
     store, at the mobile device, an item element for the item received from the portable checkout unit within a virtual shopping list of items to be purchased by the customer, the item element comprising the item identifier and a count of items associated with an item type of the item;
     receive, at the mobile device, a selection from the customer to checkout from the store; and responsive to receiving the selection from the customer, initiate a checkout transaction between the customer and the store via the client application to purchase the items in the virtual shopping list from the mobile device.

16. The computer-readable medium of claim 15, wherein the instructions for initiating the checkout transaction between the customer and the store comprise instructions that cause the processor to:

receive the list identifier at a point-of-sale system within the store; and transmit the virtual shopping list from the store system to the point-of-sale system.

17. The computer-readable medium of claim 16, wherein the instructions for initiating the checkout transaction further comprise instructions that cause the processor to: receive payment information from the customer at the point-of-sale system for items collected by the customer, the items being corresponding to list elements stored within the virtual shopping list.

18. The computer-readable medium of claim 16, further comprising instructions that cause the processor to: present a list identifier for the virtual shopping list via the mobile device.

19. The computer-readable medium of claim 15, wherein the instructions for initiating the checkout transaction comprise instructions that cause the processor to:

receive payment information from the customer via the mobile device; and execute the checkout transaction using the received payment information.

20. The computer-readable medium of claim 15, wherein the portable checkout unit comprises an item scanner, and wherein the item identifier is received via the item scanner.

* * * * *